Patented May 2, 1933

1,906,942

UNITED STATES PATENT OFFICE

WILLIAM P. TER HORST, OF PACKANACK LAKE, NEW JERSEY, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing. Application filed September 24, 1931. Serial No. 564,980.

This invention relates to the treatment of rubber and similar materials, more particularly to a treatment of the same with an aldehyde derivative of the reaction product of a ketone and an aromatic amine or amino compound. The invention also relates to the products of such treatment.

This case is a continuation-in-part of case Serial No. 411,665, filed December 4, 1929.

An object of this invention is to provide materials having the property of retarding the deterioration of rubber. Other objects will be apparent from the following detailed description.

Examples of reaction products of ketones and aromatic amino compounds of which the aldehyde derivatives form the subject matter of this invention:—acetone-aniline, acetone-phenyl hydrazine, acetone p,p'-diamino diphenyl methane, acetone-diphenylamine, acetone diphenyl formamidine, mesityl oxide-aniline, diacetone alcohol-aniline, acetone-diphenyl beta-naphthylamine, acetone-alpha naphthylamine, acetophenone-aniline, cyclohexanone-aniline, formaldehyde acetone condensation product-aniline, mesityl oxide-phenyl beta naphthylamine, acetone-triphenyl melamine, acetone - diortho - tolyl guanidine, acetone - diphenyl guanidine, acetone - p,p' - di(naphthylamino) diphenyl methane, acetone-ethyl aniline, tetramethyl diamido benzophenone-aniline, acetone-ortho-tolyl biguanide, acetone-diphenyl diamino ethane, methyl ethyl ketone-p,p'-di-amino diphenyl methane, ethylidene-acetone-p,p'-diamino diphenyl methane, acetone-mixture of beta naphthol and aniline, acetone-mixture of phenol and aniline, chloroacetone-aniline, acetone-(acetaldehyde-aniline acid condensate).

Illustrative of the invention is the treatment of rubber with such aldehyde derivatives of ketones and aromatic amino compounds as—reaction product of formaldehyde and acetone-aniline, reaction product of formaldehyde and chloracetone-aniline.

Instead of the ketones mentioned above the following may be used: phorone, diethyl ketone, benzo phenone, aceto-phenone, dichlor acetone, aldol acetone, allyl-acetone, benzal acetone, diacetyl, acetyl-acetone, acetonyl-acetone, salicylaldehyde - acetone, furfural-acetone. Instead of the aromatic amino compounds mentioned above there may be used mono-chloroaniline, ortho-toluidine, meta toluidine, para-toluidine, xylidines, alpha-naphthylamine, beta naphthylamine, amino diphenyl, dinaphthylamines, asymmetric diphenyl hydrazine, diamino diphenyl sulphide, diamino diphenyl polysulphides, di-amino, dinaphthyl sulphides, p-amino benzyl-aniline, dinaphthyl diamino ethane, di-tolyl diamino ethane, p-amino-p'naphthyl-amino diphenyl methane, p,p'-diamino diphenyl dimethyl methane, p,p'-di-(naphthyl-amino) diphenyl dimethyl methane, sym-diphenyl p-phenylene diamine, sym-dinaphthyl p-phenylene diamine, phenyl beta naphthyl guanidine, phenyl o-tolyl guanidine, di-o-tolyl biguanide, monophenyl biguanide, diphenyl biguanide, diphenyl acetamidine.

The following are to be understood as illustrative embodiments of the invention and not limiting thereof:

*Example 1.*—This type represents aldehyde reaction products of acetone-amines. Acetone-amines usually are liquids and the aldehyde derivatives usually are solid compounds. As an example, an excess of 36% aqueous formaldehyde solution is added to the acetone-aniline reaction products, and enough hydrochloric acid is added to cause an acid reaction to litmus paper. The mixture is warmed to 50° C., at which temperature a reaction suddenly starts. The temperature is kept at 70° C. during 30 minutes and the brittle product which is obtained on cooling is ground to a brown powder. The material is tested in the same manner as described above. The results are as follows:

*Reaction product of formaldehyde on acetone-aniline*

| Green tensiles | Blank | +reaction product |
|---|---|---|
| Cure 50′ at 45#  | 4215 | 4270 |
| Cure 60′ at 45#  | 4205 | 3315 |
| Cure 75′ at 45#  | 4315 | 4025 |
| Cure 90′ at 45#  | 4175 | 4235 |
| Aged 168 hrs. in oxygen | | |
| Cure 50′ at 45#  | 1255 | 2260 |
| Cure 60′ at 45#  | 1345 | 1930 |
| Cure 75′ at 45#  | 1185 | 1820 |
| Cure 90′ at 45#  | 1360 | 2210 |

Instead of formaldehyde other aldehydes may be used such as aldol, butyraldehyde, croton aldehyde, heptaldehyde.

*Example 2.*—To 115.5 grams of the reaction product of acetone and diphenylamine are added 102.5 grams of 40% aqueous formaldehyde solution and two drops of concentrated hydrochloric acid. Heat is applied until a temperature of approximately 55° C. is reached, at which point an exothermic reaction starts, causing the temperature to rise to approximately 70° C. When this first rather violent reaction is over the temperature is raised to approximately 80° C. by external application of heat and kept at 80° C. during 6 hours. The water formed during the condensation is then poured off and the formaldehyde reaction product is washed, dried, and ground. The product obtained is tested in carbon black stocks in which diphenyl guanidine is used as the accelerator. Two mixes were made up, one containing no antioxidant, called the blank, and another one containing my formaldehyde acetone-diphenylamine condensation product.

| Green tensiles lbs./sq. in. | Blank | 1.5 parts antioxidant |
|---|---|---|
| Cure 60′ at 45#  | 4690 | 4423 |
| Cure 75′ at 45#  | 4497 | 4713 |
| Aged tensiles 168 hrs. in oxygen | | |
| Cure 60′ at 45#  | 750 | 2175 |
| Cure 75′ at 45#  | 837 | 2167 |

In a truck inner tube in which the condensation product of butyraldehyde and aniline is used as the accelerator I obtain the following results:

| Green tensiles | Blank | +1 part antioxidant |
|---|---|---|
| Cure 5′ at 60#  | 2462 | 2915 |
| Cure 10′ at 60#  | 3665 | 3542 |
| Aged 8 hrs. at 245° F. 100% elong. 70# air | | |
| Cure 5′ at 60#  | 189 | 545 |
| Cure 10′ at 60#  | 102 | 346 |

This is a very severe ageing test and the acetone-diphenylamine formaldehyde condensation product is very effective in preventing undue softening of the stock.

Cured white sheeting stocks in which phenyl-o-tolyl guanidine is used as the accelerator, and containing the acetone-diphenylamine-formaldehyde condensation product as the antioxidant, show less discoloration when exposed to sunlight than similar stocks containing acetone-diphenylamine condensation product as the antioxidant. The green and aged tensiles for this white sheeting stock are given below:

| Green tensiles | Blank | + 1 part formaldehyde reaction product |
|---|---|---|
| Cure 30′ at 40#  | 3125 | 3555 |
| Cure 45′ at 40#  | 3598 | 2947 |
| Aged 168 hrs. in oxygen | | |
| Cure 30′ at 40#  | 1862 | 2640 |
| Cure 45′ at 40#  | Too poor to test. | 1910 |

A rubber tiling stock containing .06% of the formaldehyde derivative of acetone-diphenylamine reaction product is vulcanized for 18 minutes at 60 lbs. steam pressure. A sample of the stock is then subjected to oxygen at 60° C. and at a pressure of 300 lbs. per sq. in. The sample fails after 240 hours, whereas a similar stock containing no antioxidant fails in 24 hours. Samples of the cured stocks are also exposed to bright sunlight for two weeks. The sample containing the antioxidant is found to be discolored no more than the blank stock.

*Example 3.*—In a second preparation of the acetone diphenylamine-formaldehyde condensation product a much smaller amount of formaldehyde is used. To 100 grams of acetone-diphenylamine condensation product are added 20 grams aqueous formaldehyde solution 37% by weight and two drops concentrated hydrochloric acid. At 50° C. a reaction suddenly starts causing the temperature to rise to approximately 70° C. without application of external heat. The temperature is kept at 50 to 55° C. during 15 minutes.

The reaction mixture is then warmed to 105° C. in order to remove the water which was formed during the reaction. The product becomes solid on cooling and can be ground to a reddish brown powder. This material, which has a melting range of approximately 40 to 50° C. is tested in a carbon black stock in which diphenyl guanidine is used as the accelerator.

| Green tensiles | Blank | Stock containing 1 part antioxidant |
|---|---|---|
| Cure 60' at 45#  | 4712 | 4537 |
| Cure 75' at 45#  | 4423 | 4417 |
| Aged tensiles 168 hrs. in oxygen | | |
| Cure 60' at 45#  | 1456 | 2736 |
| Cure 75' at 45#  | 1495 | 3248 |
| Green abrasions | | |
| Cure 60' at 45#  | 132 | 120 |
| Cure 75' at 45#  | 144 | 139 |
| Abrasions after 168 hrs. in oxygen | | |
| Cure 60' at 45#  | 71 | 99 |
| Cure 75' at 45#  | 71 | 95 |

The acetone-diphenylamine-formaldehyde condensation product was effective in retarding the loss in resistance to abrasion of tire tread stocks. The green flex cracking values for these stocks are given below: Values are given in kilocycles, one kilocycle indicating a complete cycle of stretching and bending repeated 1,000 times. Definite cracking of the stock indicates the end point.

| Green flex cracking | Number of kilocycles to cause failure | |
|---|---|---|
| | Blank | + 1 part antioxidant |
| 60' at 45# | 87 | 121 |

In a truck inner tube in which a butyraldehyde-aniline condensation product is used as the accelerator I obtain the folowing results:

| Green tensiles | Blank | + 1 part antioxidant |
|---|---|---|
| Cure 5' at 60#  | 3995 | 3110 |
| Cure 10' at 60#  | 3355 | 3397 |
| Aged 8 hrs. at 245° F.  100% elong.  70# air | | |
| Cure 5' at 60#  | 65 | 444 |
| Cure 10' at 60#  | 65 | 319 |

After the above ageing test the blank stock is very soft and sticky, whereas the stock containing the antioxidant is still comparatively strong and resilient.

*Example 4.*—A third type of acetone diphenylamine formaldehyde condensation product is prepared simply from the acetone-diphenylamine condensation product and formaldehyde, omitting the acid catalyst.

To 50 grams of the acetone-diphenylamine condensation product are added 30 grams 37% formaldehyde solution. The mass is heated to 80° C. at which temperature a reaction starts and proceeds rather violently. The temperature is kept at 90° during one-half hour and the reaction mixture is allowed to stand during 16 hours. The water which formed during the reaction is then poured off and the reaction product is washed and air-dried. A light brown resin is obtained. This material possesses excellent antioxidant properties, as shown by the following results:

| Green tensiles | Blank | + 1 part antioxidant |
|---|---|---|
| Cure 60' at 45#  | 4577 | 4508 |
| Cure 75' at 45#  | 4600 | 4890 |
| Aged 168 hrs. in oxygen | | |
| Cure 60' at 45#  | 1168 | 2901 |
| Cure 75' at 45#  | 1477 | 2972 |

The stock used in this test is a carbon black stock in which diphenyl guanidine is used as the accelerator.

In a truck inner tube this type of acetone-diphenylamine formaldehyde condensation product shows up very well.

| Green tensiles | Blank | Stock cont. 1 part antioxidant |
|---|---|---|
| 5' at 60#  | 2965 | 2880 |
| Aged 8 hrs at 245° F. 100% elong. 70# air. | | |
| 5' at 60#  | 116 | 462 |

*Example 5.*—Acetaldol-acetone-diphenylamine condensation product. To 103.5 grams of acetone-diphenylamine condensation product and 40 grams acetaldol are added 2 drops of concentrated hydrochloric acid. When heat is applied, a reaction starts at approximately 55° C., causing the temperature to rise to approximately 75° C. The temperature is kept at 80 to 90° C. during 6 hours. The excess aldol and the water formed during the reaction are removed by distillation. 114 parts of solid product are obtained. This material is tested in a carbon black stock in which hexamethylenetetramine and diphenyl guanidine are used as the accelerators. The stocks are subjected to ageing and abrasion tests, with the results indicated in the following table:

| Green tensiles | Blank | Stock cont. 1.5 parts antioxidant |
|---|---|---|
| Cure 60′ at 45#  | 4310 | 3904 |
| Cure 75′ at 45#  | 4149 | 4630 |
| Aged 168 hrs. in oxygen. | | |
| Cure 60′ at 45#  | 1598 | 3189 |
| Cure 75′ at 45#  | 2026 | 3092 |
| Relative wear before ageing | | |
| Cure 60′ at 45#  | 144 | 142 |
| Cure 75′ at 45#  | 149 | 144 |
| Relative wear after ageing 168 hrs. in oxygen bomb | | |
| Cure 60′ at 45#  | 87 | 119 |
| Cure 75′ at 45#  | 88 | 121 |

These results show the acetaldol-acetone-diphenyl condensation product to be an excellent antioxidant.

*Example 6.*—The butyraldehyde condensation product of acetone-diphenylamine reaction product is prepared as follows: 100 grams of butyraldehyde are added to 78 grams of acetone-diphenylamine reaction product containing 2 drops of concentrated hydrochloric acid, and heat is applied. At 60° C. a reaction starts. The temperature is kept during 6 hours at approximately 60° C. 47 parts of unreacted butyraldehyde are recovered by distillation. The reaction product is a black plastic mass. Yield, 104 grams. This material is tested in which hexamethylene tetramine and diphenyl guanidine are used as the accelerators. Tensile and abrasion tests were made before and after ageing, as above:

| Green tensiles | Blank | +1 part antioxidant |
|---|---|---|
| Cure 60′ at 45#  | 4177 | 4399 |
| Cure 75′ at 45#  | 4163 | 4377 |
| Aged 168 hrs. in oxygen | | |
| Cure 60′ at 45#  | 1392 | 3150 |
| Cure 75′ at 45#  | 1360 | 3003 |
| Relative wear before ageing | | |
| Cure 60′ at 45#  | 128 | 133 |
| Cure 75′ at 45#  | 133 | 135 |
| Relative wear after ageing 168 hrs. in oxygen | | |
| Cure 60′ at 45#  | 80 | 112 |
| Cure 75′ at 45#  | 84 | 114 |

This material when tested in a white sheeting stock in which penyl o-tolyl guanidine is used as the accelerator shows the following excellent antioxidant properties:

| Green tensiles | Blank | Stock containing 1 part butyraldehyde cond. prod. |
|---|---|---|
| 30′ at 40#  | 3125 | 3555 |
| 45′ at 40#  | 3598 | 2947 |
| Aged tensiles 168 hrs. in oxygen | | |
| 30′ at 40#  | 1862 | 2640 |
| 45′ at 40#  | Too poor to test. | 1910 |

Instead of the aldehydes mentioned, other aldehydes may be used such as acetaldehyde, paraldehyde, crotonaldehyde, heptaldehyde, etc. Where the aldehyde has a low boiling point the reaction may be carried out under pressure. Instead of using a single aldehyde a mixture of aldehydes may be used. The rubber also may be treated with a mixture of the antioxidants instead of a single antioxidant material. Also in preparing the ketone-amine compounds, a mixture of ketones or a single ketone may be reacted with a single amino compound or with a mixture of amino compounds.

It is to be understood that a mixture of the reaction products may be used in rubber instead of a single reaction product. Also that a mixture of ketones or a single ketone may be reacted with a single amino compound or with a mixture of amino compounds to give products that may be used in rubber in the same manner.

The chemicals disclosed may be used to improve the properties as mentioned herein of inner tubes, tires, thread, hose, dipped goods, mechanical goods, latex or articles made from latex, etc.

In the claims the term "ketone" is to be understood as meaning organic compounds containing one or more keto groups

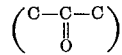

but containing no carboxylic acid

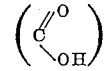

or ester groups

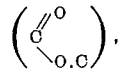, and the terms "mono-amine" and "mono-amino" as meaning organic compounds in which there is only one amino group and in which compounds there are no phenolic hydroxyl or phenol ether groups. The term "rubber" is to be construed as including natural rubber, gutta percha, balata, synthetic rubber, or other rubber-like materials.

With the detailed description given above, it will be obvious that modifications will suggest themselves without departing from the principle of the invention, for example the product resulting from the reaction of a ketone and an aromatic amino compound may also be prepared by reacting the corresponding thioketone or the corresponding ketone dihalide with the amino compound, and it is not desired to limit the invention otherwise than as set forth in the appended claims.

Having thus described my invention, what I claim and desire to protect by Letters Patent is:

1. The method of treating rubber which comprises treating rubber with an aldehyde derivative of the reaction product of a ketone and an aromatic amine.

2. The method of treating rubber which comprises treating rubber with an aldehyde derivative of the reaction product of an aliphatic ketone and an aromatic amine.

3. The method of treating rubber which comprises treating rubber with an aldehyde derivative of the reaction product of a ketone and an aromatic monoamine.

4. The method of treating rubber which comprises treating rubber with an aldehyde derivative of the reaction product of an aliphatic ketone and an aromatic monoamine.

5. The method of treating rubber which comprises treating rubber with an aldehyde derivative of the reaction product of acetone and an aromatic amine.

6. The method of treating rubber which comprises treating rubber with an aldehyde derivative of the reaction product of an aliphatic ketone and a primary aromatic amine.

7. The method of treating rubber which comprises treating rubber with an aldehyde derivative of the reaction product of an aliphatic ketone and a primary aromatic monoamine.

8. The method of treating rubber which comprises treating rubber with an aldehyde derivative of the reaction product of acetone and a primary aromatic amine.

9. The method of treating rubber which comprises treating rubber with an aldehyde derivative of the reaction product of acetone and an aromatic monoamine.

10. The method of treating rubber which comprises treating rubber with an aldehyde derivative of the reaction product of acetone and a primary aromatic monoamine.

11. The method of treating rubber which comprises treating rubber with a formaldehyde derivative of the reaction product of acetone and a primary aromatic amine.

12. The method of treating rubber which comprises treating rubber with a formaldehyde derivative of the reaction product of acetone and an aromatic monoamine.

13. The method of treating rubber which comprises treating rubber with a formaldehyde derivative of the reaction product of acetone and a primary aromatic monoamine.

14. The method of treating rubber which comprises treating rubber with a formaldehyde derivative of the reaction product of acetone and aniline.

15. Rubber derived from rubber containing an aldehyde derivative of the reaction product of a ketone and an aromatic amine.

16. Vulcanized rubber derived from rubber containing an aldehyde derivative of the reaction product of a ketone and an aromatic amine.

17. A vulcanized rubber product containing rubber which has been vulcanized in the presence of an aldehyde derivative of the reaction product of a ketone and an aromatic monoamine.

18. A vulcanized rubber product containing rubber which has been vulcanized in the presence of an aldehyde derivative of the reaction product of an aliphatic ketone and an aromatic monoamine.

19. A vulcanized rubber product containing rubber which has been vulcanized in the presence of an aldehyde derivative of the reaction product of acetone and an aromatic amine.

20. A vulcanized rubber product containing rubber which has been vulcanized in the presence of an aldehyde derivative of the reaction product of an aliphatic ketone and a primary aromatic amine.

21. A vulcanized rubber product containing rubber which has been vulcanized in the presence of an aldehyde derivative of the reaction product of an aliphatic ketone and a primary aromatic monoamine.

22. A vulcanized rubber product containing rubber which has been vulcanized in the presence of an aldehyde derivative of the reaction product of acetone and a primary aromatic amine.

23. A vulcanized rubber product containing rubber which has been vulcanized in the presence of an aldehyde derivative of the reaction of acetone and an aromatic monoamine.

24. A vulcanized rubber product containing rubber which has been vulcanized in the presence of a formaldehyde derivative of the reaction product of acetone and a primary aromatic amine.

25. A vulcanized rubber product containing rubber which has been vulcanized in the presence of a formaldehyde derivative of the reaction product of acetone and an aromatic monoamine.

26. A vulcanized rubber product containing rubber which has been vulcanized in the presence of a formaldehyde derivative of the reaction product of acetone and aniline.

27. A method of improving the properties of rubber compositions which comprises adding thereto the condensation product of formaldehyde and an aliphatic ketone-primary aromatic amine reaction product, and vulcanizing the rubber.

28. A method of improving the properties of rubber which comprises incorporating therewith the reaction product of an aliphatic aldehyde and a ketone-aromatic amine reaction product.

29. A method of improving the properties of rubber which comprises incorporating therewith the reaction product of an aliphatic aldehyde and a dialkyl ketone-aromatic mono-amine reaction product.

30. A method of improving the properties of rubber which comprises incorporating therewith the reaction product of an aliphatic aldehyde and a dialkyl ketone-aromatic mono-amine reaction product.

Signed at Montclair, county of Essex, State of New Jersey, this 18th day of September, 1931.

WILLIAM P. ter HORST.